March 4, 1969  H. L. BOWDITCH  3,430,511
LINKAGE ARRANGEMENT FOR INSTRUMENTATION APPARATUS
Filed June 6, 1966
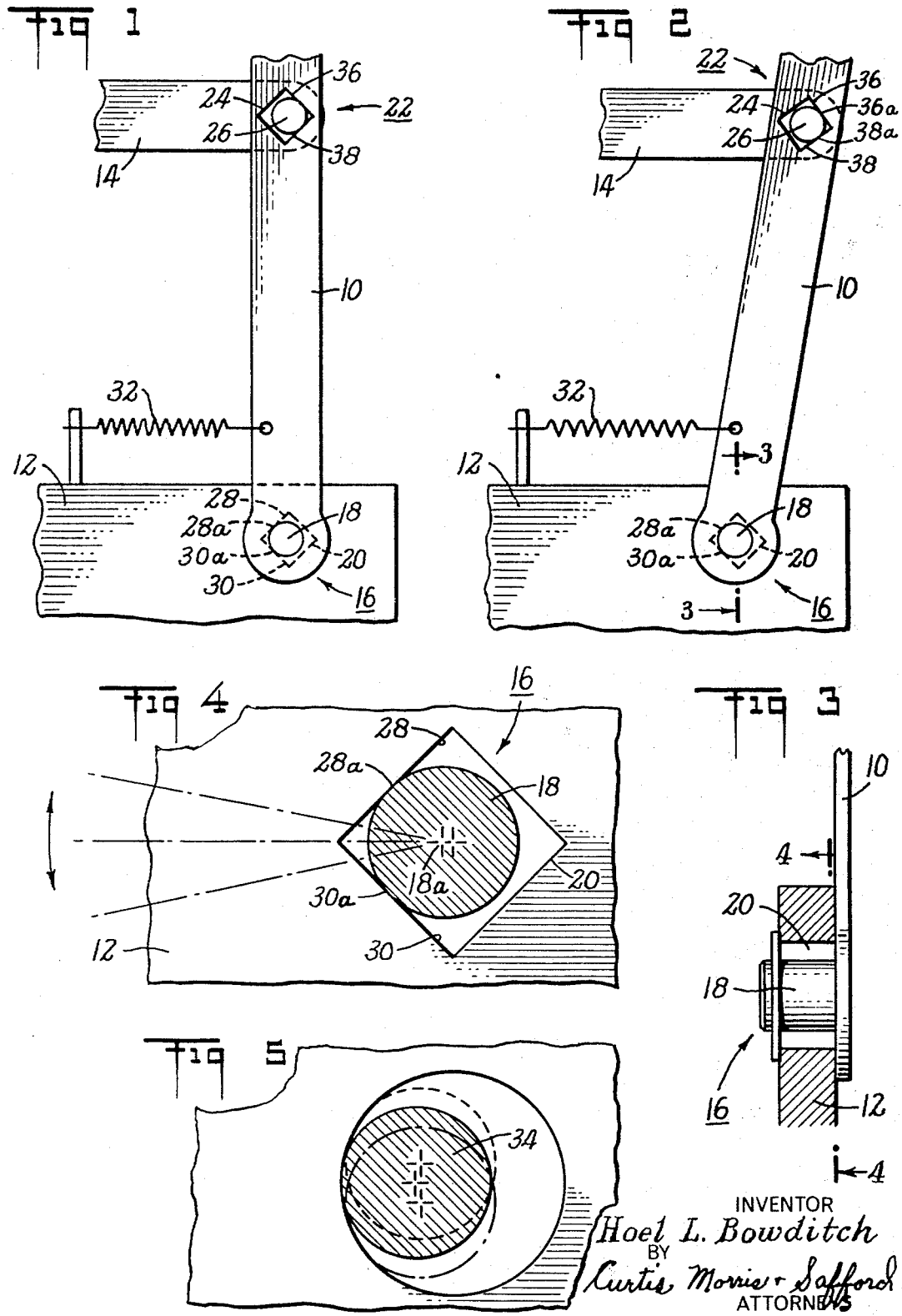
INVENTOR
Hoel L. Bowditch
BY
Curtis, Morris + Safford
ATTORNEYS

United States Patent Office 3,430,511
Patented Mar. 4, 1969

3,430,511
LINKAGE ARRANGEMENT FOR INSTRUMENTATION APPARATUS
Hoel L. Bowditch, Foxboro, Mass., assignor to The Foxboro Company, Foxboro, Mass.
Filed June 6, 1966, Ser. No. 555,388
U.S. Cl. 74—469   1 Claim
Int. Cl. G05g 1/00

ABSTRACT OF THE DISCLOSURE

A motion-transmitting linkage arrangement for use in industrial process instruments such as a chart recorder or the like, the linkage arrangement providing reduced backlash effects so as to assure accurate motion transmittal, the linkage comprising a plurality of elongate elements interconnected serially by pivot means arranged to accommodate motion in a predetermined common plane, each pivot means including a circular pin on one element fitted into a square hole in the next element, there being secured to one element a spring to urge that element in a direction to press the pins at the ends of that element against two adjacent side walls of the square hole engaged by those pins.

---

This invention relates to industrial process instrumentation of the type wherein physical movement is transmitted by means of a linkage system. More particularly, this invention relates to such a linkage system which is quite simple in construction yet is capable of transmitting motion quite accurately and efficiently.

Many industrial instruments make use of linkage systems for transmitting movement. For example, linkage systems frequently are used in chart recorders to transmit movement from a bellows or other pressure or temperature-responsive device to a pen in contact with a moving paper chart. Reference in this regard may be had to U.S. Patents 2,534,569 and 2,455,329.

The design of linkage systems for such apparatus has posed a continuing problem, at least in part because achievement of the goal of accurate position transmittal involves certain conflicting design criteria. It is, of course, highly important that backlash (sometimes referred to as "dead-band" or "lost-motion") be very small, in order to avoid the corresponding errors in positioning of the final element, e.g. a pen or the like. On the other hand, the friction of any pivoted connection must be quite low, because typically the motion-producing devices have relatively low power, and thus the transmission efficiency must be high. These requirements are particularly stringent in multi-link systems, because of the cumulative effect on backlash and friction of all the connections in the system.

The commonly used and relatively inexpensive pin-and-hole type of linkage connection introduces a particularly difficult problem with respect to backlash. The hole necessarily must have a significantly larger diameter than the pin, in order to avoid frictional binding, and this introduces the possibility of undesired backlash. The backlash itself can, of course, be taken up by spring loading on the linkage connections. However, this does not prevent errors in transmission of motion because the pin typically will engage different points around the wall of the hole depending on variables such as forces in the linkage system and the angle between the two connected links. Thus there arises the chance of a substantial error both in the "zero" of the transmission system, and also in the multiplication factor, or "range" of the system.

Although various special constructions and link connection arrangements have been proposed from time to time, none of these has been fully satisfactory for certain application.

Accordingly, it is an object of this invention to provide a linkage system which is superior to those available heretofore. It is a more specific object of this invention to provide a linkage arrangement which is simple and economical in construction, relatively low in friction with very small backlash, and affords accurate transmission of motion. Other objects, aspects and advantages of the invention will in part be pointed out in, and in part apparent from, and the following description considered together with the accompanying drawing in which:

FIGURE 1 is an elevation of a portion of a linkage system incorporating this invention;

FIGURE 2 shows the linkage arrangement of FIGURE 1 moved to a different position;

FIGURE 3 is a detail section to show the internal configuration of a pivotal connection such as illustrated in FIGURES 1 and 2;

FIGURE 4 illustrates the avoidance of offset errors when the linkage is operated; and FIGURE 5 shows how offset errors occur with the common pin-and-hole linkage connection.

Referring now to FIGURE 1, the invention is shown embodied in a linkage arrangement which illustratively includes a vertical element in the form of a lever 10 pivoted at its lower end to a plate 12. This plate may, for example, form part of the chassis of an otherwise conventional chart recording instrument. Pivotally connected to an upper portion of lever 10 is a horizontal element in the form of a link 14 and the left-hand end of which is shiftable horizontally by an input motion-producing device (not shown) such as a pressure-responsive bellows or the like.

The top of lever 10 is shown broken off to indicate that this lever may extend up to other associated mechanisms, e.g. machanisms arranged to operate an output device (not shown) such as a pen or the like. Typically, the complete linkage system will be considerably more extensive than shown herein, i.e. it would include still further linkage elements connected between the upper part of lever 10 and the output device. However, only a portion of the complete system is shown herein in order to simplify the presentation and clarify the functioning of the invention.

At the lower end of lever 10, the pivotal connection 16 consists of a pin 18 which extends through a square hole 20 formed in plate 12. Similarly, the pivotal connection 22 at the top of the lever 10 consists of a square hole 24 through which extends a pin 26 carried by the link 14. The pins can be secured in the respective holes by any conventional means such as an upset head, washer clips, or the like, illustrated for example by the section shown in FIGURE 3. The retaining means are not shown in FIGURES 1 and 2 simply to avoid interfering with the presentation of the invention.

Referring now particularly to the lower pivotal connection 16, it will be seen that the pin 18 is urged against two side walls 28 and 30 of the hole 20 by a spring 32 fastened between lever 10 and the chassis plate 12. Due to the configuration of the hole, the pin engages the side walls at only two points 28a and 30a, spaced around the periphery of the pin an angular distance less than 180°.

As shown in FIGURE 2, when the link 14 is moved to the right, the lever 10 rotates clockwise about the pivot connection 16. The spring 32 maintains the pin 18 pressed lightly against the contact points 28a and 30a during this rotation. Although different parts of the pin come into engagement with points 28a and 30a as the rotation proceeds, it will be apparent (see also FIGURE 4) that the center of rotation 18a of the pin remains fixed in position relative to these points 28a and 30a, and thus this center of rotation remains fixed relative to the chassis plate 12. This is because the pin is circular in cross-section, and thus the distance from its center to the points of contact with the walls 28 and 30 of hole 20 remain the same for the different angular positions of the pin.

During rotation of lever 10, the motion of pin 18 is purely rotational, i.e., the pin does not undergo any translational movement to engage other regions around the walls of hole 20. This is because of the constraining influence of the converging walls 28 and 30 and the action of the spring 32 urging the pin in a direction towards the region of joinder of these two converging walls. Thus, with pure rotational movement of the pin, the transmission of motion will be highly accurate. This can be compared, for example, with a conventional pin-and-hole linkage connection where, as illustrated in FIGURE 5, the pin 34, even when spring-loaded to the left, can as a result of gravity or other forces on the linkage system take numerous positions about the wall of the hole and thereby introduce serious errors in the motion transmittal.

The action at the upper pivotal connection 22 during the rotation of lever 10 follows the same principles discussed above. It may be noted, however, that in this case the square hole 24 is in the lever 10, not in the link 14, and hence the pressure of the spring 32 tends to cause the right-hand walls 36 and 38 of the hole 24 to be pressed against the pin 26, whereas in the lower connection 16 the pin is pressed by the spring against the left-hand walls 28 and 30 of the hole. This difference does not affect the functioning of the linkage connection because, as will be evident by reference to FIGURE 2, during rotation of the lever 10, the points 36a and 38a where the walls of the hole 24 engage the pin 26 remain unchanged. Thus there is no translational movement of the center of the pin 26 relative to the lever 10.

Although square holes 20 and 24 have been shown and in general are preferred, it is not essential that this precise configuration be used. For example, a hole might be formed by first making a round hole and then using a burnishing tool to create at least two relatively straight side walls which converge to a region of joinder represented by a section of the original round hole. The important feature in any event is that there be two side walls having a radius of curvature greater than the radius of the pin, and which converge towards a common region of joinder spaced away from the outer surface of the pivot pin. With such an arrangement, the spring 32 will always tend to press the pin against two particular points along the converging side walls, even though the links are rotated relative to one another.

From the above description it will be apparent that the present invention provides a linkage arrangement which, although very simple in construction, serves to transmit physical motion with improved accuracy compared, for example, to a conventional pin-in-hole pivot connection.

I claim:
1. For use in an industrial process instrument such as a chart recorder or the like, wherein motion inputs must be transmitted faithfully to an output element without hysteresis effects, a precision linkage system for transmitting such physical motion comprising, in combination: a support element adapted to serve as a reference base for the motions to be transmitted; a plurality of elongate linkage elements connected together serially for transmitting the motion; first pivot means mounting one end of one of said elongate linkage elements to said support element for rotatable movement throughout a range of angular positions in a predetermined fixed plane; second pivot means mounting one end of a second elongate linkage element to the other end of said first elongate element, said second pivot means providing for rotatable movement of said second elongate element throughout a range of angular positions with respect to said first elongate element and in said predetermined plane; each of said first and second pivot means comprising a pivot pin on one of the elements engaged with a corresponding hole formed in the other element, at least a portion of each pivot pin being cylindrical with a circular cross-section, each pin extending into its corresponding hole to pivotally connect the respective two elements together, each of said holes presenting a pair of side walls which contact the corresponding pivot pin at respective separate positions spaced around the circumference of the cylindrical portion of the pin an angular distance less than 180°, each of said side walls being plane surfaces converging to meet in a line spaced from the corresponding pivot pin; and a single extensible spring connected at one end to said support element and at its other end to said first elongate element at a point thereof between the pivot means at the two ends thereof, said other end of said spring being movable with said first elongate element and tending throughout such movement to urge said first elongate element in a direction at least approximately parallel to the axial direction of said second elongate element, the contact areas of each pair of said side walls being so located about the axis of the corresponding pivot pin that the pressure of said spring acting in said direction forces the pair of contact areas and the corresponding pin into operative bearing engagement.

References Cited

UNITED STATES PATENTS

| | | | |
|---|---|---|---|
| 3,096,665 | 7/1963 | Cappelle et al. | 74—504 X |
| 1,883,770 | 10/1932 | Dowling | 74—1 |
| 3,234,801 | 2/1966 | Valdettaro et al. | 74—10.41 |

MILTON KAUFMAN, *Primary Examiner.*

U.S. Cl. X.R.

308—37